(12) United States Patent
Weh

(10) Patent No.: US 9,039,104 B2
(45) Date of Patent: May 26, 2015

(54) HYDRAULIC BLOCK FOR A SLIP-CONTROLLED VEHICLE BRAKE SYSTEM

(71) Applicant: Robert Bosch GmbH, Stuttgart (DE)

(72) Inventor: Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 13/890,506

(22) Filed: May 9, 2013

(65) Prior Publication Data

US 2013/0306180 A1    Nov. 21, 2013

(30) Foreign Application Priority Data

May 15, 2012  (DE) ...................... 10 2012 208 080 U

(51) Int. Cl.
*B60T 8/36* (2006.01)
*F15B 21/00* (2006.01)
*F15B 13/08* (2006.01)

(52) U.S. Cl.
CPC ................. *F15B 21/00* (2013.01); *B60T 8/368* (2013.01); *F15B 13/0814* (2013.01); *F15B 13/0871* (2013.01); *F15B 13/0892* (2013.01); *Y10S 303/10* (2013.01)

(58) Field of Classification Search
CPC ........... B60T 8/00; B60T 8/368; B60T 17/02; B60T 17/04; B60T 3/36; B60T 8/40; F04B 11/00; F04B 1/0421; F04B 53/109; F16K 11/00; F15B 13/0814; F15B 13/0871; F15B 13/0892; F15B 21/00
USPC ........................................ 303/DIG. 10, 119.3
See application file for complete search history.

(56) References Cited

U.S. PATENT DOCUMENTS

| | | | |
|---|---|---|---|
| 7,753,456 B2 * | 7/2010 | Iyatani ....................... 303/119.3 |
| 2008/0258544 A1 * | 10/2008 | Iyatani ............................. 303/10 |
| 2011/0036434 A1 * | 2/2011 | Fischbach-Borazio et al. ............................. 137/861 |

FOREIGN PATENT DOCUMENTS

DE   10 2005 037 537 A1   2/2007
WO   WO 2011009662 A1 *  1/2011

* cited by examiner

*Primary Examiner* — Melanie Torres Williams
(74) *Attorney, Agent, or Firm* — Maginot Moore & Beck LLP

(57) ABSTRACT

A flat, box-shaped hydraulic block for the mechanical fastening and hydraulic interconnection of solenoid valves, pump elements, etc. of a slip-controlled vehicle brake system connects connections of installation spaces for the pump elements to connectors for a brake master cylinder and connections of receptacles for pressure build-up valves which run past one another via flat chambers on longitudinal sides of the hydraulic block and short blind bores. As a result, the receptacles of the pressure build-up valves are connected to the connectors for the brake master cylinder. The chambers damp pressure pulses of the pump elements of a piston pump.

11 Claims, 1 Drawing Sheet

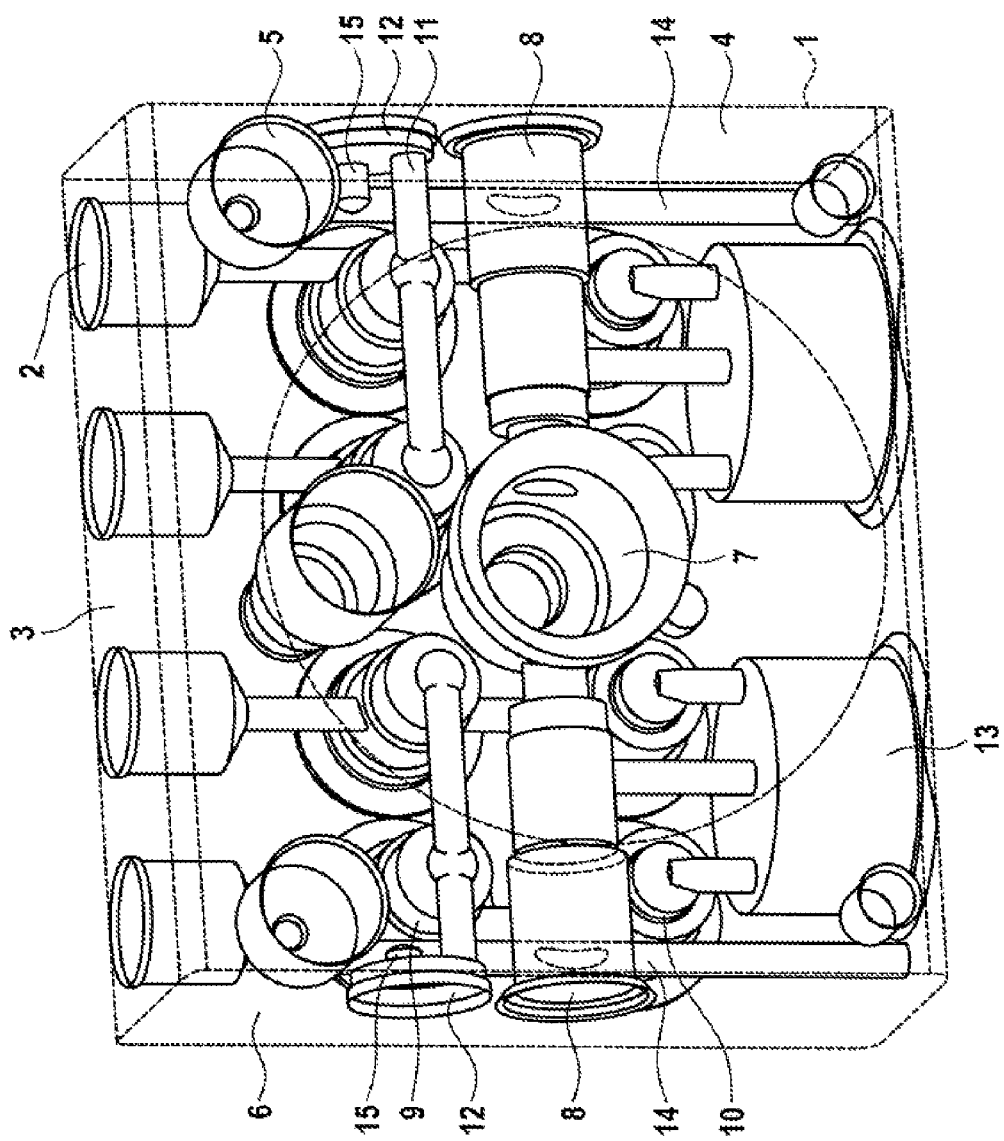

HYDRAULIC BLOCK FOR A SLIP-CONTROLLED VEHICLE BRAKE SYSTEM

This application claims priority under 35 U.S.C. §119 to patent application no. DE 10 2012 208 080.5, filed on May 15, 2012 in Germany, the disclosure of which is incorporated herein by reference in its entirety.

The disclosure relates to a box-shaped hydraulic block for a slip-controlled hydraulic vehicle brake system having the features described herein. The hydraulic block is provided, in particular, for a vehicle brake system which is controlled by an anti-lock brake system (ABS); the use of the hydraulic block for other or further slip control means such as antiskid regulation (ASR) and/or anti-slip/driving dynamic regulation means (ESP) is not ruled out.

BACKGROUND

Hydraulic blocks of this type are known. They are typically box-shaped blocks made from metal, into which connectors for a brake master cylinder and for wheel brakes, receptacles for solenoid valves, installation spaces for pump elements of a piston pump and an eccentric space for an eccentric for driving the pump elements, and connecting bores for hydraulic interconnection are made by milling and drilling Here, the connecting bores are also called connections in a generalizing manner. The hydraulic blocks serve for the installation and for the mechanical fastening and for the hydraulic interconnection of pump elements, solenoid valves, hydraulic accumulators and damping chambers of a slip control means of a hydraulic vehicle brake system. The eccentric is driven by an electric motor which is usually fastened to the outside of a side of the hydraulic block. The hydraulic block can also be cast, it being necessary for the connectors, receptacles, installation spaces and connections to be made or at least machined further by milling and drilling A hydraulic block made from a non-metallic material is also conceivable.

Laid-open specification DE 10 2005 037 537 A1 discloses a hydraulic block of this type which has the shape of a box with an upper side, a lower side, two transverse sides and two longitudinal sides. The designation of the sides serves for unambiguous designation, but does not stipulate a spatial position of the hydraulic block; the upper side does not have to be situated at the top and the underside does not have to be situated at the bottom.

SUMMARY

The hydraulic block according to the disclosure for a slip-controlled vehicle brake system having the features described herein has connectors for wheel brakes, which connectors are arranged next to one another on a transverse side of the hydraulic block. Said connectors which are also called ports serve to connect brake lines and are typically blind bores with an internal thread if the brake lines are fastened by way of screw connectors.

Furthermore, the hydraulic block according to the disclosure has connectors for a brake master cylinder, which connectors are arranged on the underside of the hydraulic block. For a dual-circuit vehicle brake system, the hydraulic block has two connectors for the two brake circuits of the brake master cylinder. The connectors for the brake master cylinder can be configured in the same way as the connectors for the wheel brakes.

Moreover, the hydraulic block according to the disclosure has receptacles for pressure build-up valves which are often also called inlet valves. The receptacles for the pressure build-up valves are arranged next to one another on the upper side of the hydraulic block. They are typically configured as stepped blind bores, in which the hydraulic part of solenoid valves which form the pressure build-up valves is received. The pressure build-up valves are fastened, for example, by calking. A dome which contains an armature of the solenoid valves typically projects from the upper side of the hydraulic block.

Furthermore, the hydraulic block according to the disclosure has installation spaces for pump elements of a piston pump which serves as hydraulic pump of the vehicle brake system and is often called a recirculating pump. The piston pump has at least one pump element with a pump piston for each brake circuit of the vehicle brake system. The installation spaces for the pump elements are usually stepped blind bores which are normally deeper, for example from 2.5 to 3 times deeper, than the receptacles for the solenoid valves.

The hydraulic block according to the disclosure has connections of the receptacles for the pressure build-up valves, which connections connect the receptacles for the pressure build-up valves of a brake circuit to one another. The connections are typically bores.

Further connections connect the connectors for the brake master cylinder to the installation spaces for the pump elements in each brake circuit.

According to the disclosure, the connectors for the brake master cylinder are arranged below connectors for the wheel brakes, and, for each connector for the brake master cylinder, the hydraulic block has a connection to an installation space for a pump element and to a receptacle for a brake-pressure build-up valve, that is to say the brake master cylinder is connected to a pump element and a pressure build-up valve in each brake circuit, the pressure build-up valves of a brake circuit in turn being connected to one another. The connections to the connectors for the brake master cylinder open into or intersect the installation spaces for the pump elements in such a way that, if the pump elements are installed, they communicate with pressure sides or outlets of the pump elements. That is to say, the brake master cylinder is connected to the brake-pressure build-up valves and the pressure sides or outlets of the pump elements. This is meant by the wording "a pressure side of an installation space for a pump element." Outer connectors for wheel brakes are preferably arranged below the connectors for the brake master cylinder. The outer connectors for wheel brakes are situated close to the longitudinal sides of the hydraulic block or at any case between inner connectors for wheel brakes and the longitudinal sides of the hydraulic block. "Below" means that a circumferential face, that is to say an imaginary extension of the connectors for the brake master cylinder, intersects the connectors for wheel brakes. A spacing of the connectors for the brake master cylinder from the transverse side of the hydraulic block, on or in which the connectors for the wheel brakes are arranged, is smaller than a depth of the connectors for the wheel brakes. This makes shortening possible, that is to say a shorter hydraulic block.

The connections of the connectors for the brake master cylinder to the installation spaces for the pump elements and the receptacles for the brake-pressure build-up valves pass through as far as a transverse side of the hydraulic block, which transverse side lies opposite the transverse side, on which the connectors for the wheel brakes are arranged, in order for it to be possible to drill connections in the hydraulic block. The transverse side, on which the connectors for the wheel brakes are arranged, is "blocked" by the connectors for the wheel brakes and the connectors for the brake master cylinder. The connections are closed in a pressure-tight manner on the transverse side of the hydraulic block, for example, by a ball being pressed in.

The disclosure further provides a chamber in the hydraulic block, which chamber communicates with the pressure sides of the installation spaces for the pump elements, the connectors for the brake master cylinder and the receptacles for the brake-pressure build-up valves. Said chambers form damper chambers; they make volumes available which damp pressure pulses in brake fluid which pump elements cause during their operation and the pressure build-up valves cause in the case of switching during slip control. The chambers reduce reaction effects of pressure pulses of this type in the brake fluid on the brake master cylinder during slip control. It is not necessary for this refinement that the connections of the connectors for the brake master cylinder with the installation spaces for the pump elements and the receptacles for the pressure build-up valves pass through as far as that transverse side of the hydraulic block which lies opposite the transverse side, on which the connectors for the wheel brakes are arranged.

BRIEF DESCRIPTION OF THE DRAWING

In the following text, the disclosure will be explained in greater detail using one exemplary embodiment which is shown in the drawing. The single FIGURE shows a hydraulic block according to the disclosure in a perspective illustration. The hydraulic block is illustrated in a transparent manner, in order that bores, etc. which are made in it are visible.

DETAILED DESCRIPTION

The drawing shows a hydraulic block 1 according to the disclosure for a slip-controlled vehicle brake system. The hydraulic block 1 is illustrated in a transparent manner, in order to show its connectors, brake lines, receptacles for solenoid valves, etc. The hydraulic block 1 is box-shaped and flat, and it is approximately one third as high as it is wide and long. In plan view, the hydraulic block 1 is virtually square. It is composed of steel or die-cast aluminum, and the connectors, receptacles, etc. are produced by drilling and milling; in the case of a cast production of the hydraulic block 1, they can already be present at least partially in the blank and can be machined further by drilling and milling.

The hydraulic block 1 serves to fasten and hydraulically interconnect hydraulic components (not shown) of an antilock braking system of a hydraulic vehicle brake system, such as solenoid valves, pump elements, hydraulic accumulators, etc. The use of the hydraulic block 1 for other or further slip control means such as antiskid regulation (ASR) and/or antislip/driving dynamic regulation means (ESP) is not ruled out.

The hydraulic block 1 has four connectors 2 for fastening brake lines which lead to wheel brakes. The connectors 2 for the wheel brakes are arranged in a straight line next to one another on a transverse side 3 of the hydraulic block 1 close to a flat side of the hydraulic block 1, which flat side is called the upper side here and faces away from the observer in the drawing.

On a flat side which is called the underside 4 here, the hydraulic block 1 has two connectors 5 for brake lines, which connectors 5 lead to the two brake circuits of a dual-circuit brake master cylinder. The connectors 5 for the brake master cylinder are arranged close to longitudinal sides 6 of the hydraulic block 1 and likewise close to, but at a greater distance from, that transverse side 3 of the hydraulic block 1 which has the connectors 2 for the wheel brakes. Outer connectors 2 for the wheel brakes are situated below the connectors 5 for the brake master cylinder, which is to say below the bottom of the connectors 5 for the brake master cylinder and in an extension of the connectors 5 for the brake master cylinder. An imaginary cylindrical circumferential face of the connectors 5 for the brake master cylinder intersects the two outer connectors 2 for the wheel brakes. The connectors 5 for the brake master cylinder are offset to the outside with respect to the two outer connectors 2 for the wheel brakes, that is to say the connectors 5 for the brake master cylinder are situated closer to the longitudinal sides 6 of the hydraulic block 1 than the two outer connectors 2 for the wheel brakes.

The connectors 2, 5 for the wheel brakes and the brake master cylinder are also called ports. They are cylindrical blind bores which are approximately as deep as their diameter and which are less than half as deep as the thickness of the hydraulic block 1. For a screw connection of the brake lines, the connectors 2, 5 are provided with internal threads (not shown), other connection options also being possible, for example, by calking, crimping.

Approximately in the center, the hydraulic block 1 has an eccentric space 7 which serves to receive an eccentric (not shown) for driving two pump elements. The eccentric space 7 is a cylindrical blind bore with a stepped diameter which is open on the underside 4 of the hydraulic block 1 and reaches almost as far as the upper side. Coaxially with respect to the eccentric space 7, an electric motor (not shown), possibly with a flange-connected gear mechanism, is fastened to the outside of the underside 4 of the hydraulic block 1, on the shaft of which electric motor the eccentric (not shown) is fastened.

Two installation spaces 8 for pump elements which run parallel to the transverse sides 3 of the hydraulic block 1 and are open at the longitudinal sides 6 of the hydraulic block 1 open radially into the eccentric space 7. The installation spaces 8 for the pump elements are cylindrical bores with a stepped diameter which pass from the longitudinal sides 6 of the hydraulic block 1 as far as the eccentric space 7, into which they open. Pump elements (not shown) are installed into the installation spaces 8, which pump elements comprise pump pistons of a piston pump (not shown), which pump pistons are driven by way of the eccentric (likewise not shown) which is situated in the eccentric space 7 after installation. For each brake circuit, the hydraulic block 1 has an installation space 8 for a pump element. Because the hydraulic block 1 receives the pump elements of the piston pump (not shown) and the eccentric for driving it, it can also be considered to be and can be called a pump housing.

On one side next to the installation spaces 8 for the pump elements, the hydraulic block 1 has four receptacles 9 for pressure build-up valves and, on the other side of the installation spaces 8 for the pump elements, it has receptacles 10 for pressure lowering valves. The pressure build-up valves are also called inlet valves and the pressure lowering valves are also called outlet valves. They are solenoid valves, the hydraulic part of which is situated in the receptacles 9, 10 in the hydraulic block 1. A dome of the pressure build-up and lowering valves which contains an armature projects to the outside from the upper side of the hydraulic block 1. The upper side of the hydraulic block 1 faces away from the observer in the drawing. The receptacles 9, 10 for the pressure build-up and lowering valves are stepped cylindrical blind bores which open on the upper side of the hydraulic block 1. The receptacles 9 for the pressure build-up valves are arranged in a straight line next to one another on one side of the installation spaces 8 for the pump elements and the receptacles 10 for the pressure lowering valves are likewise arranged in a straight line next to one another on the other side of the installation spaces 8 for the pump elements. In each case two receptacles 9 for the pressure build-up valves on one side of the hydraulic block 1, in relation to a longitudinal center of the hydraulic block 1, which are assigned to a brake circuit are connected to one another by way of a connection 11. The connections 11 are produced as bores which run parallel to the receiving spaces 8 for the pump elements along a bottom of the receptacles 9 for the pressure build-up valves. On the longitudinal sides 6 of the hydraulic block 1, the connections 11 of the receptacles 9 for the pressure build-up valves open into flat, cylindrical chambers 12 which are closed by way of covers (not shown) in the shape of circular disks, by rotary friction welding, adhesive bonding or brazing, for example. The chambers 12 are produced as countersunk depressions or flat depressions in the longitudinal sides 6 of the hydraulic block 1.

On a transverse side which lies opposite the connectors 2 for the wheel brakes, the hydraulic block 1 has two receptacles 13 for hydraulic accumulators which communicate with the installation spaces 8 for the pump elements and the receptacles 10 for the pressure lowering valves. The receptacles 13 for the hydraulic accumulators are cylindrical blind bores, the diameter of which is somewhat smaller than the thickness of the hydraulic block 1.

The hydraulic block 1 has connections 14 of the connectors 5 for the brake master cylinder to the installation spaces 8 for the pump elements. The connections 14 are configured as bores which, starting from that transverse side of the hydraulic block 1 which is remote from the connectors 2 for the wheel brakes, run parallel to the longitudinal sides 6 and the upper side and the underside 4 of the hydraulic block 1 and intersect tangentially with the installation spaces 8 for the pump elements, with the result that they communicate with the installation spaces 8, and open at a bottom into the connectors 5 for the brake master cylinder. Openings of the connections 14 on the transverse side of the hydraulic block 1 are closed by way of balls which are pressed in. The connections 14 intersect the installation spaces 8 for the pump elements in such a way that, if the pump elements are installed, they communicate with their pressure sides, that is to say the pump outlets. The connections 14 are guided to that transverse side of the hydraulic block 1 which lies opposite the connectors 2 for the wheel brakes, because they have to be drilled from this transverse side. The other transverse side 3 of the hydraulic block 1 is "blocked" by the connectors 2, 5 for the wheel brakes and the brake master cylinder.

The chambers 12 have short blind bores 15 which intersect tangentially with the connections 14 of the connectors 5 for the brake master cylinder and the installation spaces 8 for the pump elements. By way of the blind bores 15 which can likewise be considered to be connections, the connections 14 of the connectors 5 for the brake master cylinder and the installation spaces 8 for the pump elements are connected to the chambers 12 and, by way of the chambers 12, their connections 11 are connected to the receptacles 9 for the pressure build-up valves. In other words: the chambers 12 communicate with the connectors 5 for the brake master cylinder, the installation spaces 8 for the pump elements and the receptacles 9 for the pressure build-up valves. The chambers 12 damp any pressure jumps and pressure fluctuations, for example pressure pulses of the pump elements of the piston pump and pressure jumps which the pressure build-up valves cause during switching. The connections 11 of the chambers 12 to the receptacles 9 for the pressure build-up valves run through below the connections 14 of the installation spaces 8 for the pump elements and the connectors 5 of the brake master cylinder, that is to say said connections 11, 14 run past one another without coming into contact. The blind bores 15 and the connections 11 of the chambers 12 to the receptacles 9 for the pressure build-up valves run parallel to one another and to the installation spaces 8 for the pump elements, that is to say perpendicularly with respect to the longitudinal sides 6 of the hydraulic block 1.

What is claimed is:

1. A box-shaped hydraulic block for a slip-controlled vehicle brake system comprising:
    an upper side;
    an underside;
    two transverse sides;
    two longitudinal sides;
    a plurality of wheel brake connectors defined next to one another on one of the two transverse sides of the hydraulic block;
    a plurality of brake master cylinder connectors defined on the underside of the hydraulic block;
    a plurality of pressure build-up valve receptacles defined next to one another on the upper side of the hydraulic block;
    a plurality of installation spaces for pump elements of a piston pump;
    a plurality of pressure build-up valve receptacle connections; and
    one installation space connection between each brake master cylinder connector of the plurality of brake master cylinder connectors and a pressure side of a corresponding installation space of the plurality of installation spaces,
    wherein the wheel brake connectors are defined below the brake master cylinder connectors,
    wherein the installation space connections connect the brake master cylinder connectors and the installation spaces to a pressure build-up valve receptacle, and
    wherein the installation space connections extend through to an other transverse side of the two transverse sides of the hydraulic block opposite the one transverse side.

2. The hydraulic block according to claim 1, wherein:
    the plurality of wheel brake connectors includes outer connectors, and
    the outer connectors are defined below the brake master cylinder connectors.

3. The hydraulic block according to claim 1, wherein the installation space connections each define a chamber.

4. The hydraulic block according to claim 3, wherein:
    each chamber communicates by way of the pressure build-up valve connections and, via a blind bore, by way of the installation space connections and with a pressure build-up valve receptacle.

5. The hydraulic block according to claim 3, wherein the chambers are defined in the longitudinal sides of the hydraulic block.

6. The hydraulic block according to claim 4, wherein the pressure build-up valve receptacle connection and the blind bore open at a bottom of the chamber and extend parallel to the installation space.

7. The hydraulic block according to claim 1, wherein the pressure build-up valve receptacle connections and the installation space connections extend past one another without a direct connection.

8. The hydraulic block according to claim 1, wherein the installation space connections extend laterally past the pressure build-up valve receptacles.

9. The hydraulic block according to claim 8, wherein the installation space connections are located between the pressure build-up valve receptacles and the longitudinal sides of the hydraulic block.

10. The hydraulic block according to claim 1, wherein the installation spaces for the pump elements open on the longitudinal sides of the hydraulic block.

11. The hydraulic block according to claim 1, wherein each of the installation space connections and the pressure build-up valve receptacle connections extend parallel to the two transverse sides or the two longitudinal sides of the hydraulic block.

\* \* \* \* \*